US007940266B2

(12) United States Patent
Shearer

(10) Patent No.: US 7,940,266 B2
(45) Date of Patent: *May 10, 2011

(54) DYNAMIC REALLOCATION OF PROCESSING CORES FOR BALANCED RAY TRACING GRAPHICS WORKLOAD

(75) Inventor: Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 657 days.

This patent is subject to a terminal disclaimer.

(21) Appl. No.: 11/549,198

(22) Filed: Oct. 13, 2006

(65) Prior Publication Data

US 2008/0088622 A1    Apr. 17, 2008

(51) Int. Cl.
G06T 15/50 (2011.01)
(52) U.S. Cl. ........................................................ 345/426
(58) Field of Classification Search .................... None
See application file for complete search history.

(56) References Cited

U.S. PATENT DOCUMENTS

| | | | | |
|---|---|---|---|---|
| 4,866,637 | A * | 9/1989 | Gonzalez-Lopez et al. .. | 345/426 |
| 5,933,146 | A * | 8/1999 | Wrigley ......................... | 345/420 |
| 6,111,582 | A * | 8/2000 | Jenkins .......................... | 345/421 |
| 6,438,553 | B1 * | 8/2002 | Yamada ............................. | 1/1 |
| 6,625,611 | B1 * | 9/2003 | Teig et al. ....................... | 707/102 |
| 6,683,614 | B2 * | 1/2004 | Walls et al. .................... | 345/506 |
| 6,963,342 | B2 * | 11/2005 | Pascual et al. ................. | 345/506 |
| 7,012,604 | B1 * | 3/2006 | Christie et al. ................ | 345/426 |
| 7,143,128 | B1 * | 11/2006 | Baweja et al. ................. | 709/201 |
| 7,164,420 | B2 * | 1/2007 | Ard .............................. | 345/423 |
| 7,471,291 | B2 * | 12/2008 | Kaufman et al. .............. | 345/424 |
| 2003/0227455 | A1 * | 12/2003 | Lake et al. ..................... | 345/421 |
| 2005/0256826 | A1 * | 11/2005 | Hambrick et al. ................. | 707/1 |
| 2006/0066607 | A1 * | 3/2006 | Schmittler et al. ............ | 345/419 |
| 2006/0149951 | A1 * | 7/2006 | Abernathy et al. ............ | 712/240 |
| 2007/0182732 | A1 * | 8/2007 | Woop et al. .................... | 345/420 |
| 2007/0296725 | A1 * | 12/2007 | Steiner et al. ................. | 345/505 |
| 2008/0043018 | A1 * | 2/2008 | Keller et al. ................... | 345/426 |
| 2008/0074416 | A1 * | 3/2008 | Brown et al. .................. | 345/420 |
| 2008/0074417 | A1 * | 3/2008 | Mejdrich et al. .............. | 345/420 |
| 2008/0074420 | A1 * | 3/2008 | Kuesel et al. ................. | 345/426 |
| 2008/0082784 | A1 * | 4/2008 | Mejdrich et al. ................. | 712/4 |

OTHER PUBLICATIONS

Sano et al. Data-Parallel Volume Rendering with Adaptive Volume Subdivision. 2000.*
Wald et al. Distributed Interactive Ray Tracing of Dynamic Scenes. Proceedings of the 2003 IEEE Symposium on Parallel and Large-Data Visualization and Graphics. 2003.*
Marchesin et al. Dynamic Load Balancing for Parallel Volume Rendering. Eurographics Symposium on Parallel Graphics and Visualization. 2006.*

(Continued)

*Primary Examiner* — Daniel F Hajnik
(74) *Attorney, Agent, or Firm* — Patterson & Sheridan, LLP

(57) ABSTRACT

A ray tracing image processing system may use a plurality of processing elements to render a two dimensional image from a three dimensional scene. A first portion of the processing elements may function as workload managers responsible for performing operations relating to traversing a ray through a spatial index, and a second portion of the processing elements may function as vector throughput engines responsible for performing operations relating to determining if a ray intersects primitives contained within bounding volumes. By monitoring workloads experienced by the processing elements for a particular frame, processing element function may be reallocated such that for a subsequent frame the workload experienced by processing elements in the image processing system may be balanced. Balanced workload may improve the performance of the image processing system.

20 Claims, 7 Drawing Sheets

OTHER PUBLICATIONS

Wan et al. High Performance Presence-Accelerated Ray Casting. Proceedings of the Conference on Visualization '99: Celebrating Ten Years. 1999.*

Parker et al. Interactive Ray Tracing for Isosurface Rendering. Proceedings of the conference on Visualization '98. 1998.*

Zagha et al. Performance Analysis Using the MIPS R10000 Performance Counters. Proceedings of the 1996 ACM/IEEE Conference on Supercomputing. 1996.*

Palmer et al. Ray Casting on Shared-Memory Architectures: memory-hierarchyconsiderations in volume rendering. IEEE Concurrency. vol. 6. Issue 1. 1998.*

Nieh et al. Volume Rendering on Scalable Shared-Memory MIMD Architectures. Proceedings of the 1992 Workshop on Volume Visualization. 1992.*

* cited by examiner

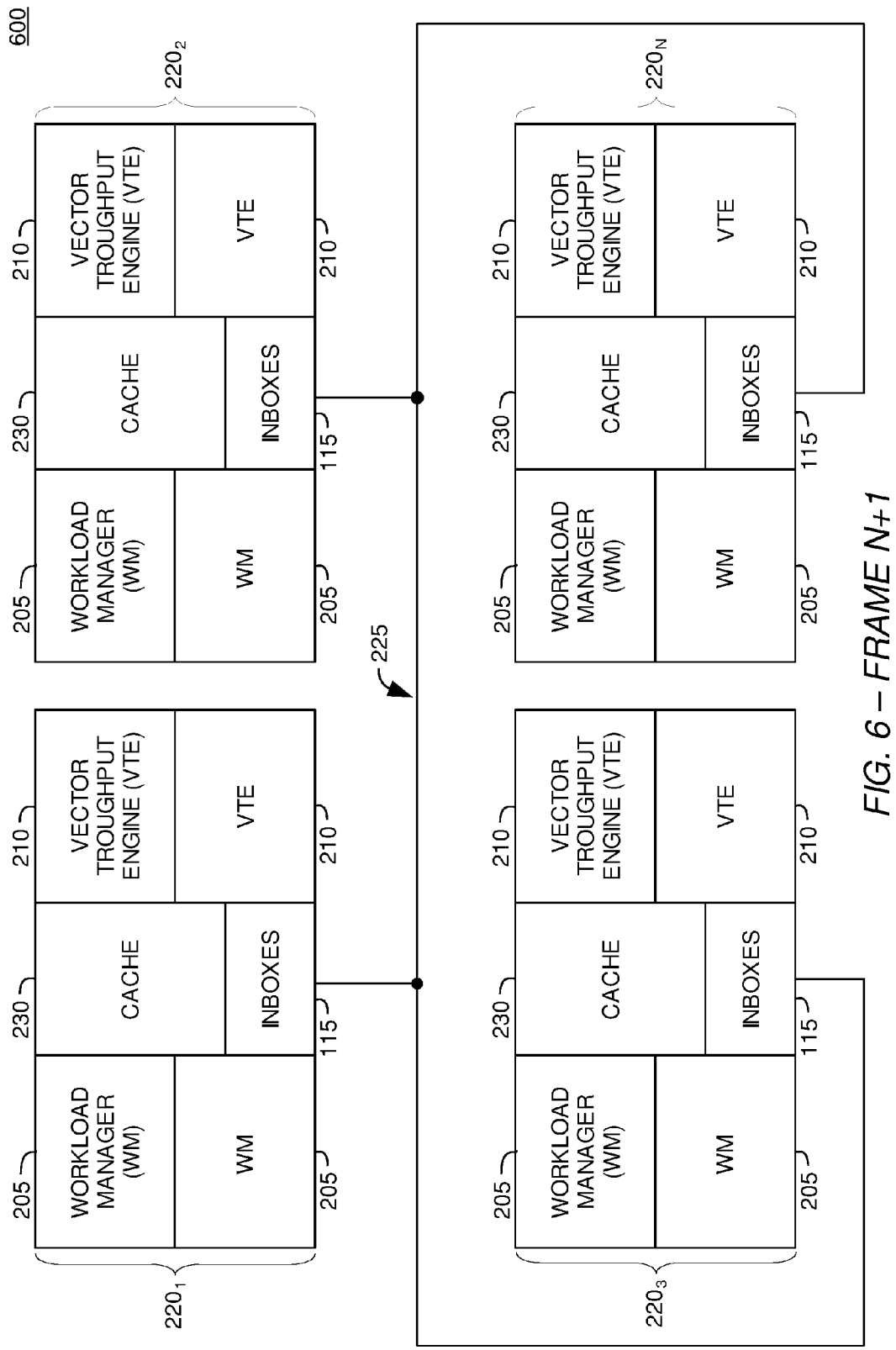
FIG. 6 – FRAME N+1

DYNAMIC REALLOCATION OF PROCESSING CORES FOR BALANCED RAY TRACING GRAPHICS WORKLOAD

BACKGROUND OF THE INVENTION

1. Field of the Invention

Embodiments of the invention generally relate to the field of computer processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention a method of distributing workload in a ray tracing image processing system is provided. The method generally comprising: allocating a first portion of a plurality of processing elements to traverse rays through a spatial index having nodes defining bounded volumes of a three dimensional scene, wherein the first portion of the plurality of processing elements traverse the spatial index by taking branches from internal nodes until the rays are traversed to leaf nodes, wherein branches are taken based on whether the rays intersect bounding volumes defined by the nodes; allocating a second portion of the plurality of processing elements to determine if the rays hit primitives contained in the bounding volumes defined by the leaf nodes; performing ray tracing; monitoring workload experienced by the first portion and the second portion; and reallocating the processing elements between the first portion and the second portion based on the workload experienced by the first portion and the second portion.

According to another embodiment of the invention a computer readable medium is provided. The computer readable medium containing a program which, when executed, performs an operation, generally comprising: allocating a first portion of a plurality of processing elements to traverse rays through a spatial index having nodes defining bounded volumes of a three dimensional scene, wherein the first portion of the plurality of processing elements traverse the spatial index by taking branches from internal nodes until the rays are traversed to leaf nodes, wherein branches are taken based on whether the rays intersect bounding volumes defined by the nodes; allocating a second portion of the plurality of processing elements to determine if the rays hit primitives contained in the bounding volumes defined by the leaf nodes; performing ray tracing; monitoring workload experienced by the first portion and the second portion; and reallocating the processing elements between the first portion and the second portion based on the workload experienced by the first portion and the second portion.

According to another embodiment of the invention an image processing system is provided. The image processing system generally comprising: a first plurality of processing elements configured traverse rays through a spatial index having nodes defining bounded volumes of a three dimensional scene, wherein the first portion of the plurality of processing elements traverse the spatial index by taking branches from internal nodes until the rays are traversed to leaf nodes, wherein branches are taken based on whether the rays intersect bounding volumes defined by the nodes; and a second plurality of processing elements configured to determine if the rays hit primitives contained in the bounding volumes defined by the leaf nodes; and wherein the image processing system is configured to monitor a workload experienced by the first plurality of processing elements and a workload experienced by the second plurality of processing elements; and if the workload experienced by the first plurality of processing elements and the workload experienced by the second plurality of processing elements are unbalanced, reallocate processing elements from at least one of the first or second pluralities of processing elements.

BRIEF DESCRIPTION OF THE DRAWINGS

FIGS. 2 and 6 illustrate multiple core processing element networks, according to embodiments of the invention.

DETAILED DESCRIPTION OF THE PREFERRED EMBODIMENTS

Figure 1:
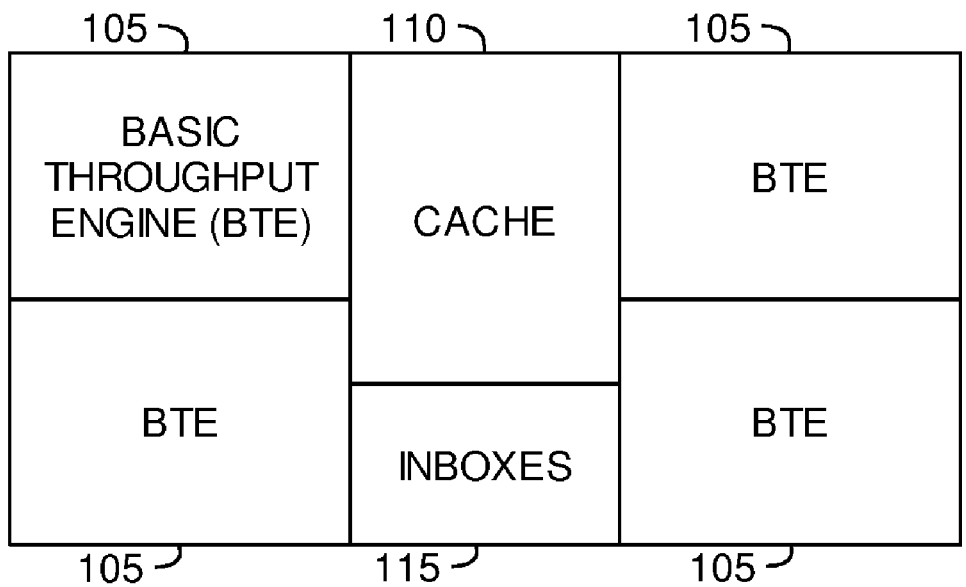
FIG. 1 illustrates a multiple core processing element, according to one embodiment of the invention.

Embodiments of the invention provide methods and apparatus for monitoring and reallocating processor element resources in an image processing system to achieve balanced ray tracing workload, according to one embodiment of the invention. According to one embodiment of the invention, an image processing system may use a plurality of processing elements to render a two dimensional image from a three dimensional scene. A first portion of the processing elements may perform operations related to tracing a ray through a spatial index, while a second portion of the processing elements may perform operations related to determining if a ray intersects a primitive located within a particular bounding volume. The characteristics of the three dimensional scene being rendered by the image processing system may change over time. These changes may require more operations relating to tracing rays through the spatial index, or may require more operations relating to determining if rays intersect primitives. According to embodiments of the invention, the workload experienced by the processing elements in the image processing system may be monitored. Furthermore, in response to the monitored workload the number of processing elements assigned to perform the different operations (i.e., tracing a ray through a spatial index or determining if rays intersect primitives) may be adjusted such that each processing element experiences a relatively equal amount of workload.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Processor Layout and Communications Network

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
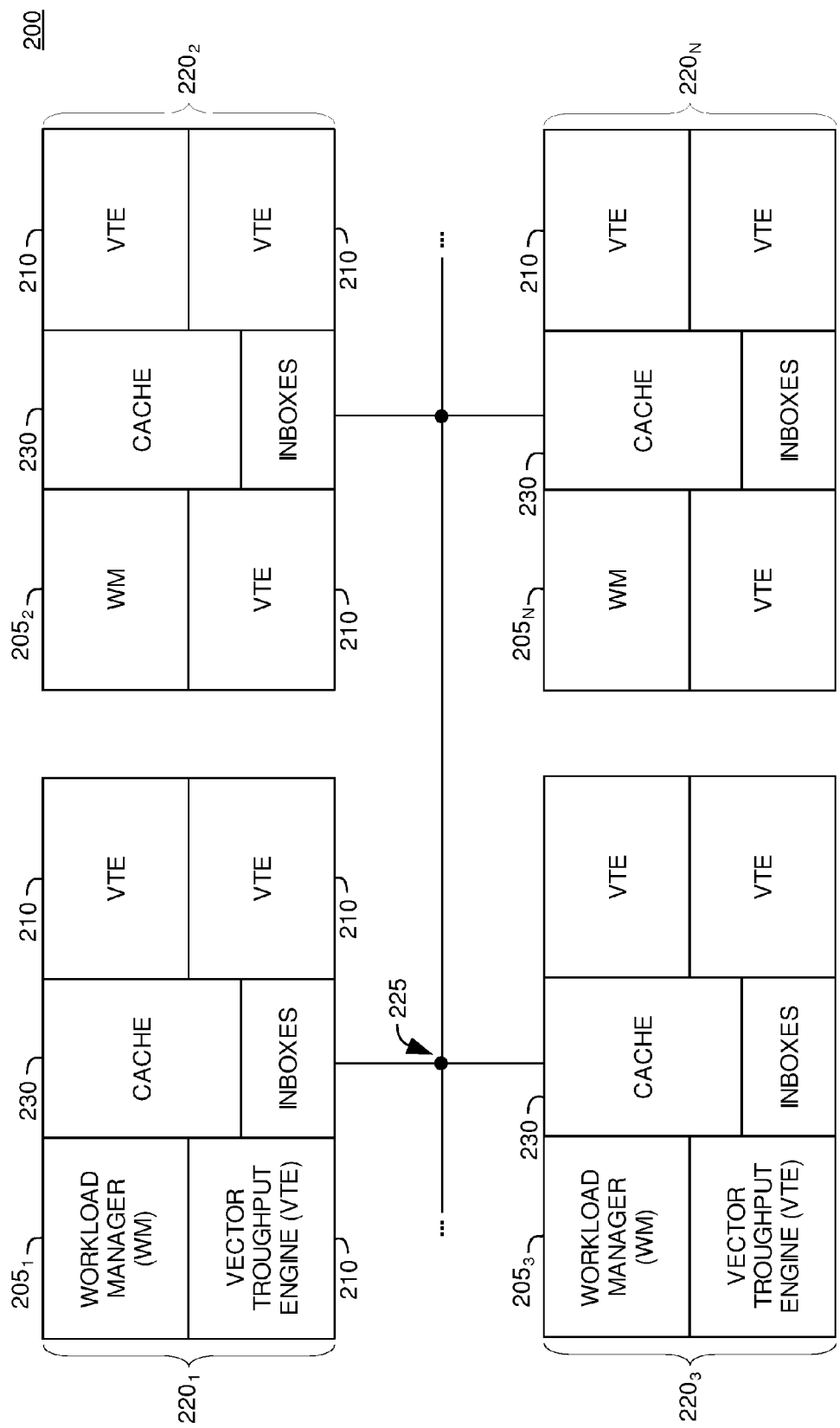

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each multiple core processing element $220_{1-N}$ in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements $220_{1-N}$ according to one embodiment of the invention. Each of the vector throughput engines 210 may use the high speed bus 225 to communicate with other vector throughput engines 210 or the workload managers $205_{1-N}$. The workload manager processors 205 may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager communications.

An Exemplary Three Dimensional Scene

Figure 3:
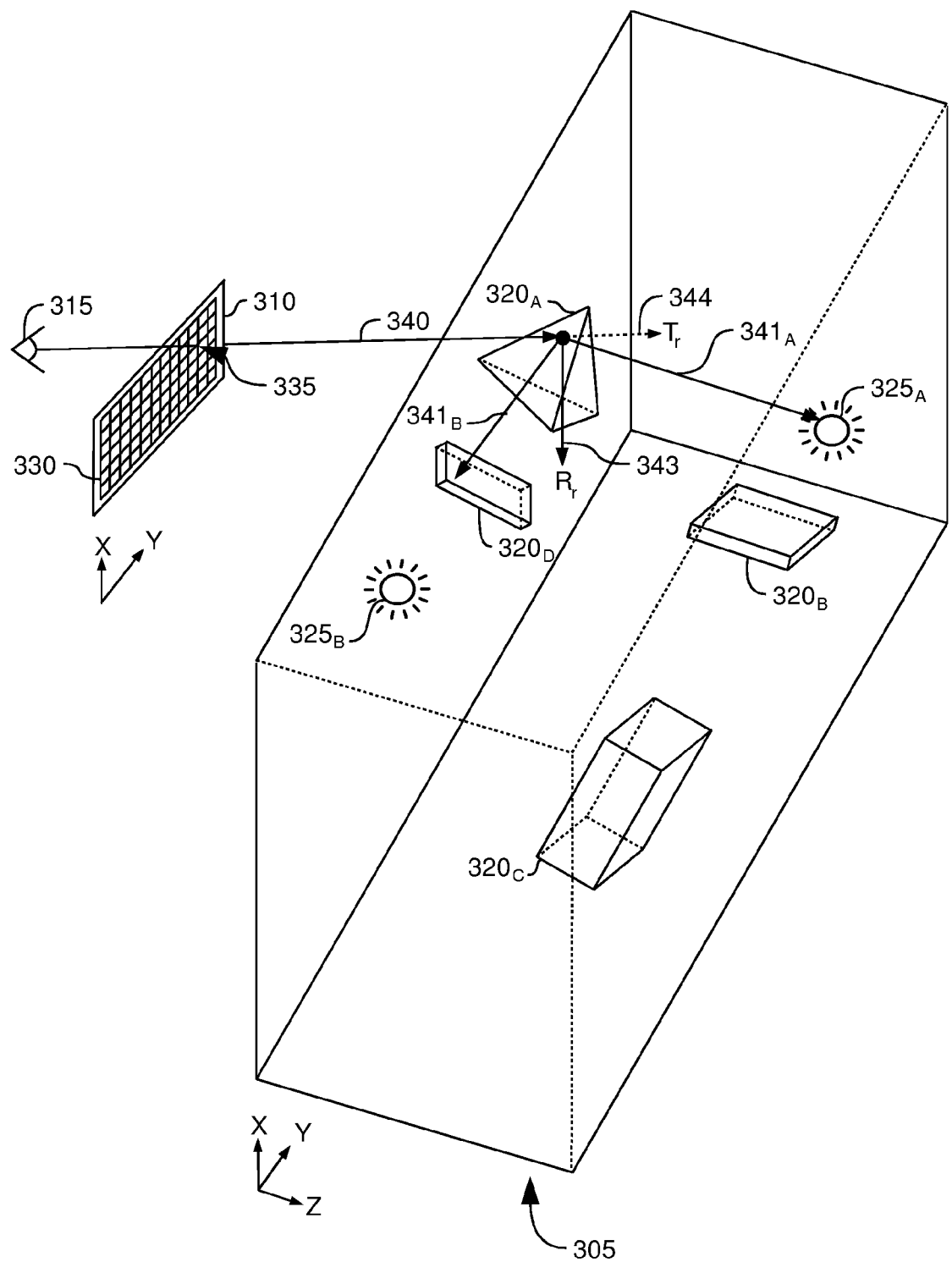
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. The grid 330 may be referred to as a frame. Each individual pixel may display a different color to render the final composite two-dimensional picture on the monitor 310. An image processing system using a ray tracing image processing methodology to render a two dimensional picture from a three-dimensional scene will calculate the colors that the issued ray or rays encounters in the three dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene the ray 305 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, shadow rays 341 may be issued to determine the contribution of light to the point where the original ray 340 intersected the object. If the object has translucent properties, the image processing system may issue a transmitted ray 344 to determine what color or light to be transmitted through the body of the object. If the object has reflective properties, the image processing system may issue a reflected ray to determine what color or light is reflected onto the object 320.

One type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected onto the object. Reflected rays traverse away from the object at an angle relative to the angle at which the original ray intersected the object. For example, reflected ray 343 may be issued by the image processing system to determine what color or light may be reflected onto the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
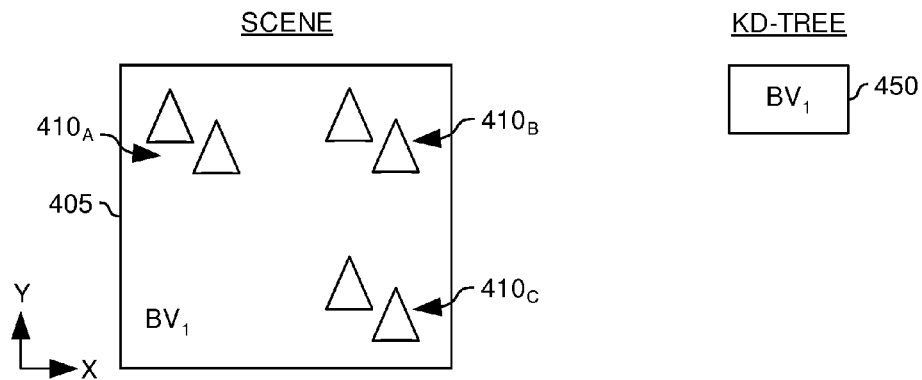
FIGS. 4A-4C illustrate a two dimensional space to be rendered by an image processing system and a corresponding spatial index created by an image processing system, according to one embodiment of the invention.
Figure 4B:
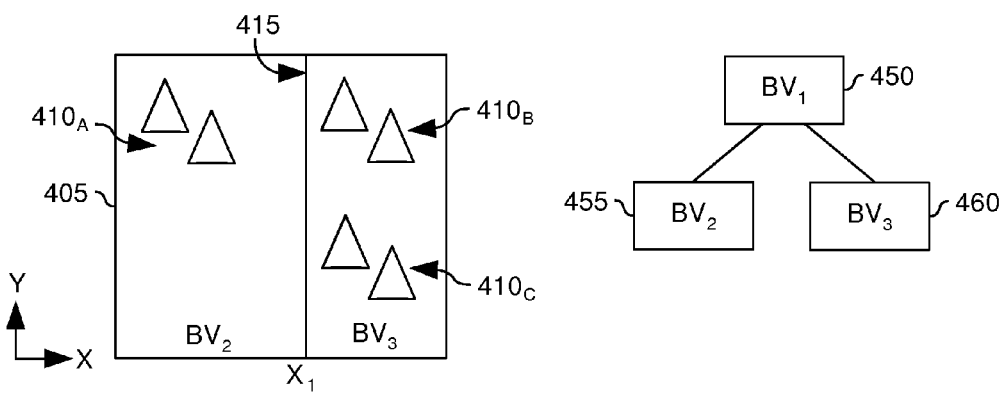
Figure 4C:
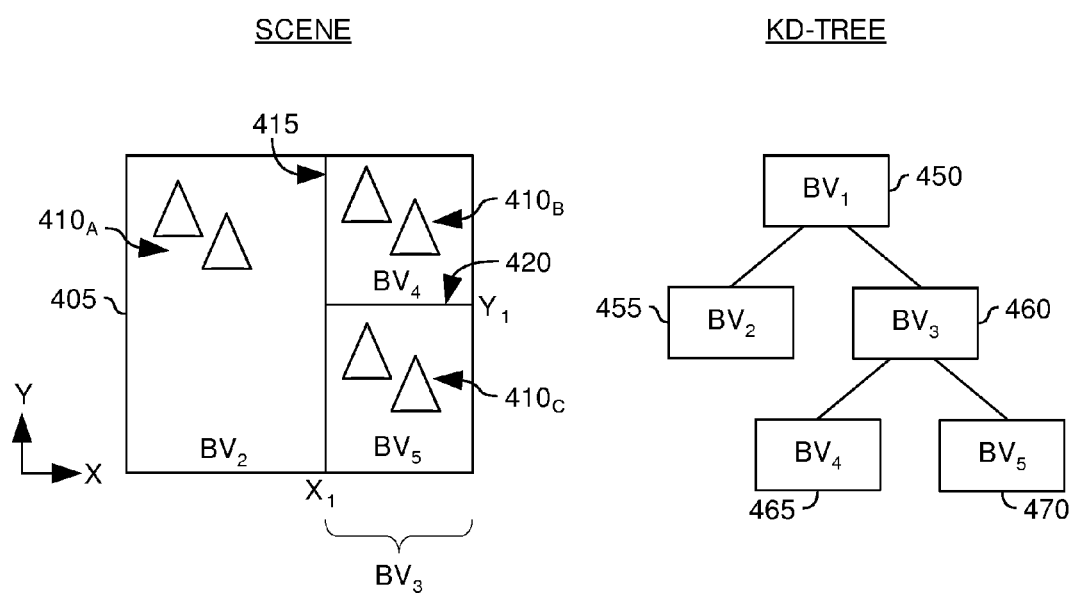

FIGS. 4A-4C illustrate a two dimensional space to be rendered by an image processing system and a corresponding kd-tree. For simplicity, a two dimensional scene is used to illustrate the building of a kd-Tree, however kd-Trees may also be used to represent three dimensional scenes. In the two dimensional illustration of FIGS. 4A-4C splitting lines are illustrated instead of splitting planes, and bounding areas are illustrated instead of bounding volumes as would be used in a three dimensional structure. However, one skilled in the art will quickly recognize that the concepts may easily be applied to a three dimensional scene containing objects.

FIG. 4A illustrates a two dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node BV$_4$ may contain pointers to primitives 410$_B$, and leaf node BV$_5$ may contain pointers to primitives 410$_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Dynamic Reallocation of Processing Cores for Balanced Ray Tracing Graphics Workload An image processing system which renders two dimensional images from the three dimensional scene may use a network of multiple core processing elements in order to render the image. For a particular frame a number of the processing elements may function as workload managers and a number of the processing elements may function as vector throughput engines. The workload managers may be responsible for traversing rays through a spatial index by performing ray-bounding volume intersection tests, and the vector throughput engines may be responsible for determining if rays intersect primitives contained within bounding volumes by performing ray-primitive intersection tests.

The ratio of workload managers to vector throughput engines in a multiple core processing element network may be set for a particular frame, and for that frame the workload experienced by the workload managers and vector throughput engines may be relatively even or balanced. However, over time due to various factors (e.g., changes in the three dimensional scene) the workload may become unbalanced, resulting in inefficient use of processing resources and possibly poor performance from the image processing system. According to embodiments of the invention, workload experienced by the processing elements may be monitored and the ratio of workload managers to vector throughput engines may be adjusted to achieve balanced workload in response to changes in workload.

FIG. 2 illustrates a multiple core processing element network 200 which may be used to render an image (frame) from a three dimensional scene. As illustrated in FIG. 2, the multiple core processing element network 200 contains four workload managers 205$_{1-N}$ and twelve vector throughput engines 210. This ratio of workload managers to vector throughput engines in the network of multiple core processing elements 200 may efficiently render images from a three dimensional scene over a period of time. However, over time workloads experienced by the processing elements may become unbalanced. The workloads experienced by the processing elements may become unbalanced because the three dimensional scene may change (e.g., changes in position or shape of objects, number of objects within the three dimensional scene, etc.). Changes in the three dimensional scene may change the amount of spatial index traversal operations which may need to be performed by workload managers or may change the amount of ray-primitive intersection tests which may need to be performed by vector throughput engines. In other words, changes in the three dimensional scene may change the workload experienced by the various processing elements within the multiple core processing element network. The changes in workload may result in an unbalanced distribution of workload, wherein the ratio of workload managers 205 to vector throughput engines 210 which was efficient for a previous frame is not efficient for the current or future frames.

Unbalanced workload distribution amongst the processing elements may result in inefficient use of processor resources. That is, unbalanced workload distribution may result in some processing elements executing relatively few operations while other processing elements experience a backlog of operations waiting to be performed. Unbalanced workload distribution may also result in poor image processing system performance.

According to one embodiment of the invention, in order to avoid unbalanced workload distribution and thus inefficient use of processor resources, the image processing system may monitor workload experienced by the processing elements in the image processing system and reallocate processing element function accordingly. By reallocating processing element function (e.g., from vector throughput engine to workload manager, or vice versa), workload experienced by the processing elements may be balanced, and, consequently, image processing system performance may be improved.

Figure 5:
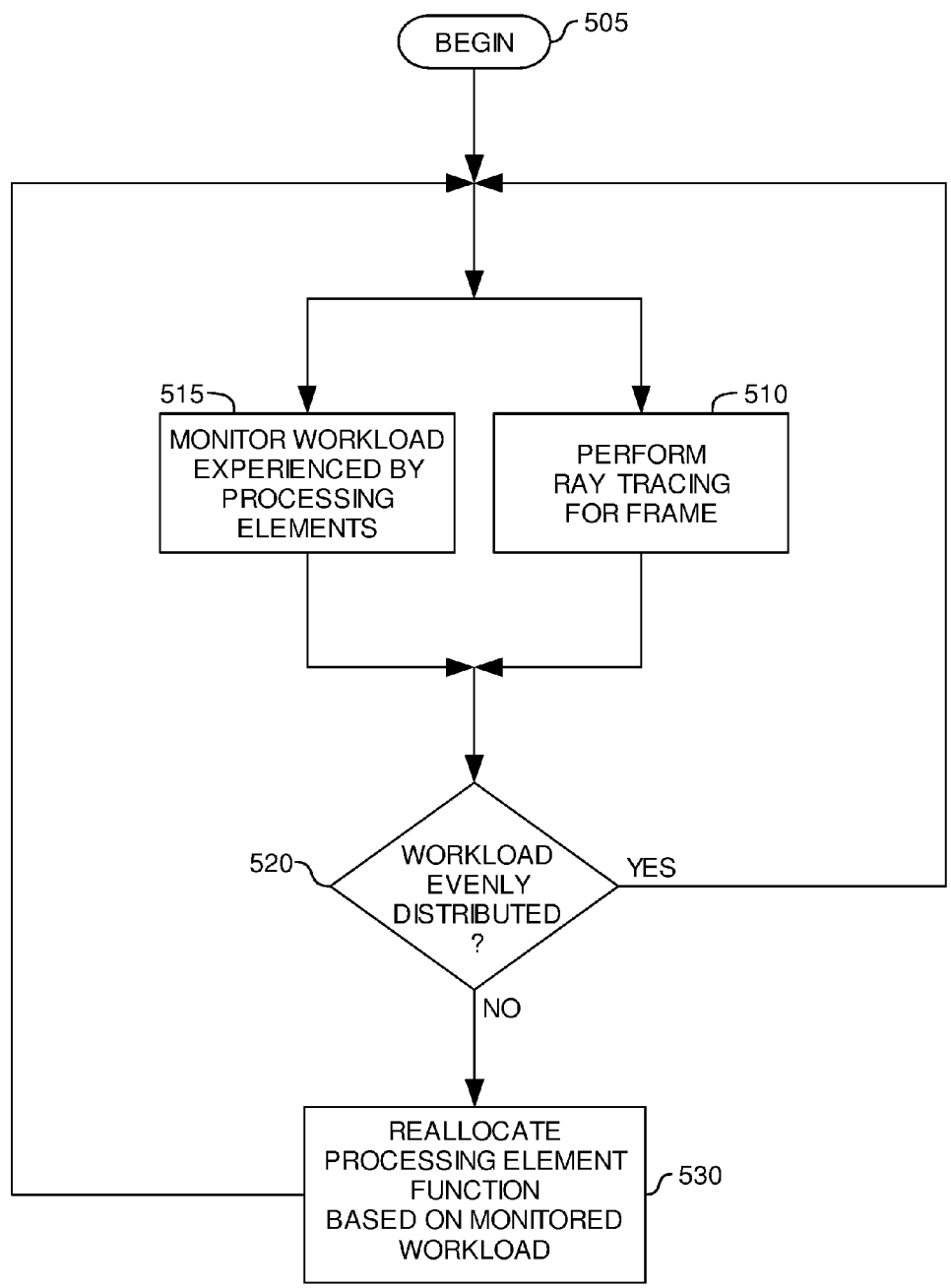
FIG. 5 is a flowchart illustrating a method of monitoring workload experienced by processing elements in an image processing system and adjusting the operations performed by the processing elements, according to one embodiment of the invention.

FIG. 5 illustrates a method 500 of monitoring workload experienced by processing elements and reallocating the operations performed by the processing elements in response to the monitored workload, according to one embodiment of the invention. The method 500 begins at step 505, for example, when an image processing system may commence rendering a two dimensional image from a three dimensional scene.

Next, the image processing system may proceed to steps 510 and 515. At step 510, the image processing system may perform ray tracing for a frame. While the image processing system is performing ray tracing for the frame the workload managers 205 in the image processing system may perform operations relating to tracing rays through a spatial index and the vector throughput engines may perform operations relating to determining if the rays intersect primitives contained within bounding volumes. During the execution of step 510, at step 515 the image processing system may monitor workload experienced by the processing elements (e.g., workload managers 205 and vector throughput engines 210) in the multiple core processing element network 200.

The image processing system may monitor the workload experienced by the processing elements by monitoring various performance parameters associated with each processing element. For example, the workload presented to a processing element may be determined by examining a performance counter for a processing element. A performance counter may compile data relating to performance events within a processing element (e.g., number of reads or writes executed by a processing element). The workload present to the processing element may also be determined monitoring the traffic through an inbox (e.g., an inbox located within the inboxes 115) corresponding to the processing element. A higher amount of traffic through the inbox may indicate an increased workload experienced by the processing element.

After performing ray tracing for a frame and monitoring the workload experienced by the processing elements (e.g., workload managers 205 and vector throughput engines 210), the image processing system may proceed to step 520. At step 520 the image processing system may determine if the workload was distributed evenly between the processing elements. This may be accomplished by comparing the workloads experienced by the workload managers 205 to the workload experienced by the vector throughput engines 210.

According to one embodiment of the invention, if the workload managers 205 experience relatively the same workload as the vector throughput engines, the image processing system may retain the same ratio of workload managers 205 to vector throughput engines 210 and return to step 510 and 515 to perform operations relating to rendering the next frame. However, if at step 520 the image processing system determined that the workload is not evenly distributed, the image processing system may proceed to step 530. At step 530 the image processing system may reallocate the function of some processing elements within the multiple core processing element network 200, based on the workload monitored in step 515. After step 530, the image processing system may return to steps 510 and 515 to render the next frame and monitor processing element workload, respectively.

For example, as described above, FIG. 2 illustrates a multiple core processing network 200, according to one embodiment of the invention. Furthermore, as previously described, the processing element allocation shown in FIG. 2 has four workload managers 205 and twelve vector throughput engines 210. Using the multiple core processing element network 200, at step 510 the image processing system may perform ray tracing for a frame (e.g., Frame N). At step 515 the image processing system may monitor workload experienced by the processing elements (e.g., workload managers 205 and vector throughput engines 210) while performing the ray tracing for the frame (e.g., Frame N). Next, at step 520, the image processing system may determine whether or not the workload was evenly distributed amongst the processing elements when rendering the frame.

For example, the image processing system may determine in step 520 that the workload managers 205 present in the multiple core processing element network 200 experienced a higher workload in comparison to the vector throughput engines 210. Therefore, the image processing system may proceed to step 530 where the image processing system may re-allocate the function of a portion of the processing elements within the multiple core processing element network 200 based on the monitored workload.

For example, FIG. 6 illustrates a multiple core processing element network 600 wherein the image processing system has reallocated the function of processing elements in response to an unbalanced workload distribution. As illustrated in FIG. 6, the image processing system has reallocated the function of the processing elements to provide more processing elements which perform workload manager operations. Specifically, in response to the increased workload experienced by workload managers when rendering Frame N, the image processing element has increased the number of processing elements which may perform workload manager functions from 4 in FIG. 2, to 8 in FIG. 6. Furthermore, the image processing system has decreased the number of processing elements which may perform vector throughput engine functions from 12 in FIG. 2, to 8 in FIG. 6. After the image processing system has reallocated the function of processing elements, the image processing system may proceed to steps 610 and 615 to render the next frame (Frame N+1) using the new processing element distribution 600 (i.e., illustrated in FIG. 6).

In addition to reallocating function of a processing element on a core-by-core basis, according to another embodiment of the invention, the image processing system may reallocation function on a thread-by-thread basis. As described above with respect to FIG. 1, each processing element (e.g., basic throughput engine 105) may include a plurality of processing threads. Each of those threads may be capable of executing instructions relating to workload manager operations or executing instructions relating to vector throughput engine operations. Thus, each thread within a processing element may function either as a vector throughput engine or as a workload manager. According to one embodiment of the invention, the image processing system may balance workload amongst processing elements within the multiple core processing element network 200 by reallocating thread function according to the monitored workload.

For example, a single core may contain four processing threads which, for a first frame, two of the four threads may be allocated to performing workload manager functions and the other two of the four threads may be allocated to performing vector throughput engine functions. After performing ray tracing for the first frame, the image processing system may determine that more processing resources are needed to perform workload manager functions. Thus, according to one embodiment of the invention, the image processing system may reallocate the processing threads to perform different functions.

For example, in response to the determination that more processing resources are needed to perform workload manager functions, one of the processing threads which for the previous frame performed vector throughput engine functions may be reallocated to perform workload manager functions. Consequently, after reallocation three of the four threads may be allocated to performing workload manager functions and one may be allocated to performing vector throughput engine functions. Thus, workload may be redistributed in a multiple core processing element network 200 by reallocating the processor threads of processing elements according to workload monitored by the image processing system.

The load balance interval may vary widely for different embodiments. For example, the load balance interval may vary from frequent (e.g., multiple timers per frame) to relatively infrequent (e.g., once per 'N' frames wherein N may be very large). For some embodiments, the load balancing interval may be determined by the ratio of load imbalance drift (which may depend on the scene data and user input) to the cost overhead of the load balancing itself. This overhead may include the necessary performance measurements (to measure loads), thread swapping, and the like.

CONCLUSION

A ray tracing image processing system may use a plurality of processing elements to render a two dimensional image from a three dimensional scene. A first portion of the processing elements may function as workload managers responsible for performing operations relating to traversing a ray through a spatial index, and a second portion of the processing elements may function as vector throughput engines responsible for performing operations relating to determining if a ray intersects primitives contained within bounding volumes. By monitoring workloads experienced by the processing elements for a particular frame, processing element function may be reallocated such that for a subsequent frame the workload of processing elements may be balanced. Balanced workload may improve the performance of the image processing system.

While the foregoing is directed to embodiments of the present invention, other and further embodiments of the invention may be devised without departing from the basic scope thereof, and the scope thereof is determined by the claims that follow.

What is claimed is:

1. A method of distributing workload in a ray tracing image processing system, comprising:
    configuring one or more processors to perform an operation comprising:
        allocating a first portion of a plurality of processing elements to only traverse rays through a spatial index having nodes defining bounded volumes of a three dimensional scene, wherein the first portion of the plurality of processing elements traverse the spatial index by taking branches from internal nodes until the rays are traversed to leaf nodes, wherein branches are taken based on whether the rays intersect bounding volumes defined by the nodes;
        allocating a second portion of the plurality of processing elements to only determine if the rays hit primitives contained in the bounding volumes defined by the leaf nodes and not to traverse rays through the spatial index;
        monitoring workload experienced by the first portion and the second portion while performing ray tracing by the first and second portions; and
        reallocating the processing elements between the first portion and the second portion based on the workload experienced by the first portion and the second portion.

2. The method of claim 1, wherein monitoring workload comprises monitoring inboxes corresponding to the first portion of processing elements and inboxes corresponding to the second portion of processing elements.

3. The method of claim 2, wherein monitoring inboxes comprises monitoring the amount of traffic through the inboxes.

4. The method of claim 1, wherein monitoring workload comprises monitoring performance counters corresponding to the first portion of processing elements and performance counters corresponding to the second portion of processing elements.

5. The method of claim 4, wherein reallocating the processing elements occurs on a frame to frame basis.

6. The method of claim 1, wherein each processing element comprises a plurality of processing threads, and wherein each processing thread may perform operations relating to traversing a ray through a spatial index and determining if rays intersect primitives located within bounding volumes.

7. The method of claim 6, wherein reallocation of the processing elements between the first portion and the second portion is done on a thread level, wherein a first portion of threads for a first processing element performs operations relating to traversing a ray through the spatial index and a second portion of threads for the first processing element performs operations relating to determining if rays intersect primitives located within bounding volumes.

8. A non-transitory computer readable storage medium containing a program which, when executed, performs an operation, comprising:
    allocating a first portion of a plurality of processing elements to only traverse rays through a spatial index having nodes defining bounded volumes of a three dimensional scene, wherein the first portion of the plurality of processing elements traverse the spatial index by taking branches from internal nodes until the rays are traversed to leaf nodes, wherein branches are taken based on whether the rays intersect bounding volumes defined by the nodes;
    allocating a second portion of the plurality of processing elements to only determine if the rays hit primitives contained in the bounding volumes defined by the leaf nodes and not to traverse rays through the spatial index;
    monitoring workload experienced by the first portion and the second portion while performing ray tracing by the first and second portions; and
    reallocating the processing elements between the first portion and the second portion based on the workload experienced by the first and the second portion.

9. The computer readable storage medium of claim 8, wherein monitoring workload comprises monitoring inboxes corresponding to the first portion of processing elements and inboxes corresponding to the second portion of processing elements.

10. The computer readable storage medium of claim 8, wherein monitoring workload comprises monitoring performance counters corresponding to the first portion of processing elements and performance counters corresponding to the second portion of processing elements.

11. The computer readable storage medium of claim 10, wherein reallocating the processing elements occurs on a frame to frame basis.

12. The computer readable storage medium of claim 8, wherein each processing element comprises a plurality of processing threads, and wherein each processing thread may perform operations relating to traversing a ray through a spatial index and determining if rays intersect primitives located within bounding volumes.

13. The computer readable storage medium of claim 12, wherein reallocation of the processing elements between the first portion and the second portion is done on a thread level, wherein a first portion of threads for a first processing element performs operations relating to traversing a ray through the spatial index and a second portion of threads for the first processing element performs operations relating to determining if rays intersect primitives located within bounding volumes.

14. An image processing system, comprising:
    a first plurality of processing elements configured only to traverse rays through a spatial index having nodes defining bounded volumes of a three dimensional scene, wherein the first portion of the plurality of processing elements traverse the spatial index by taking branches from internal nodes until the rays are traversed to leaf nodes, wherein branches are taken based on whether the rays intersect bounding volumes defined by the nodes; and
    a second plurality of processing elements configured only to determine if the rays hit primitives contained in the bounding volumes defined by the leaf nodes and not to traverse rays through the spatial index; and wherein the image processing system is configured to monitor a workload experienced by the first plurality of processing elements and a workload experienced by the second plurality of processing elements while performing ray tracing by the first and second plurality of processing elements; and if the workload experienced by the first plurality of processing elements and the workload experienced by the second plurality of processing elements are unbalanced, reallocate processing elements from at least one of the first or second pluralities of processing elements.

15. The image processing system of claim 14, wherein reallocating processing elements from at least one of the first or second pluralities of processing elements comprises:
   if the workload experienced by the first plurality of processing elements is greater than the workload experienced by the second plurality of processing elements, reallocate processing elements from the second plurality of processing elements to the first plurality of processing elements; and
   if the workload experienced by the second plurality of processing elements is greater than the workload experienced by the first plurality of processing elements, reallocate processing elements from the first plurality of processing elements to the second plurality of processing elements.

16. The image processing system of claim 14, wherein monitoring workload comprises monitoring inboxes corresponding to the first plurality of processing elements and inboxes corresponding to the second plurality of processing elements.

17. The image processing system of claim 14, wherein monitoring workload comprises monitoring performance counters corresponding to the first plurality of processing elements and performance counters corresponding to the second plurality of processing elements.

18. The image processing system of claim 17, wherein performance counters count the number of instructions executed by a processing element.

19. The image processing system of claim 14, wherein each processing element in the first or second plurality of processing elements comprises a plurality of processing threads, and wherein each processing thread may perform operations relating to traversing rays through a spatial index and determining if rays intersect primitives located within bounding volumes.

20. The image processing system of claim 19, wherein reallocation of the processing elements between the first portion and the second portion is done on a thread level, wherein a first portion of threads for a first processing element performs operations relating to traversing a ray through the spatial index and a second portion of threads for the first processing element performs operations relating to determining if rays intersect primitives located within bounding volumes.

* * * * *